(12) United States Patent
Schluterman

(10) Patent No.: US 12,213,456 B1
(45) Date of Patent: Feb. 4, 2025

(54) PROTECTIVE SHROUD FOR SHOCK WIRE COUPLING

(71) Applicant: Chris Schluterman, Subiaco, AR (US)

(72) Inventor: Chris Schluterman, Subiaco, AR (US)

( * ) Notice: Subject to any disclaimer, the term of this patent is extended or adjusted under 35 U.S.C. 154(b) by 477 days.

(21) Appl. No.: 17/720,365

(22) Filed: Apr. 14, 2022

Related U.S. Application Data

(60) Provisional application No. 63/175,132, filed on Apr. 15, 2021.

(51) Int. Cl.
*A01K 3/00* (2006.01)
*H01R 13/52* (2006.01)
*H02G 15/06* (2006.01)
*E04H 17/24* (2006.01)

(52) U.S. Cl.
CPC ......... *A01K 3/005* (2013.01); *H01R 13/5213* (2013.01); *H02G 15/06* (2013.01); *E04H 17/24* (2013.01)

(58) Field of Classification Search
CPC .... A01K 3/005; H01R 13/5213; H02G 15/06; E04H 17/24
See application file for complete search history.

(56) References Cited

U.S. PATENT DOCUMENTS

| | | | |
|---|---|---|---|
| 4,753,196 A | 6/1988 | Lack et al. | 119/72 |
| 4,836,504 A * | 6/1989 | Fingerson | A01K 3/005 |
| | | | 256/10 |
| 4,884,528 A | 12/1989 | Steudler, Jr. | 119/72.5 |
| 5,097,797 A | 3/1992 | Van Zee et al. | 119/57.4 |
| 5,097,798 A | 3/1992 | Little | 119/72 |
| 5,178,079 A | 1/1993 | Hostetler | 119/72 |
| 5,875,733 A * | 3/1999 | Chen | A01K 39/0125 |
| | | | 119/57.4 |
| 2006/0186393 A1 * | 8/2006 | Santelli | E04H 17/1447 |
| | | | 256/65.11 |

* cited by examiner

*Primary Examiner* — Pete T Lee
(74) *Attorney, Agent, or Firm* — Keisling & Pieper PLC; David B. Pieper; Trent C. Keisling

(57) ABSTRACT

The invention discloses a shroud or guard that provides a housing to protect electrical couplings in a livestock facility. The guard may be placed on conventional feed and water supply lines and over their associated shock wires to prevent animals from destroying the electrical connections that supply electricity to the shock wires.

3 Claims, 5 Drawing Sheets

PROTECTIVE SHROUD FOR SHOCK WIRE COUPLING

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The invention pertains to improvements in animal husbandry and more particularly to animal care installations and even more particularly to poultry houses and the equipment therein. Known art can be found in U.S. Class 119, subclass 72 and in U.S. Class 119, subclass 57.4 and in other classes and subclasses.

2. Description of the Known Art

Those skilled in the art will appreciate that it is often desirable to feed and water animals from drop down feeders and waterers that are suspended from the ceiling of a containment house. To prevent animals, and especially birds, from interfering with the feed and water supply lines associated with these drop down feeders and waterers, whether by sitting or roosting or flying into or otherwise travelling across them, it has been a common practice to install electric shock lines immediately above and secured to these feed and water supply lines. These shock lines work by shocking the transgressing animals to deter them from spending any substantial time actually on the supply lines. While these shock lines work well for their intended purpose, they themselves and especially the electrical couplings supplying electricity to the shock lines are often abused by the animals, whether by trampling or pecking. Thus, a device to protect the coupling is desirable.

Known art which may be relevant to the present invention includes the following patents with their abstracts, the teachings of which are hereby expressly incorporated by reference.

U.S. Pat. No. 4,753,196 issued to Lack, et al., on Jun. 28, 1988, entitled Animal watering apparatus and method is for a water line, made up of joined sections of PVC pipe, that may have any desired length. The pipe is suspended from drops at ten (10) foot intervals for example. The pipe is partially supported in plastic drop hangers having insulating and elastic properties. The drop hangers have an aperture at the upper end for connection to a drop, a laterally opening recess at the lower end to receive the pipe in snap-in relation, and a laterally opening recess intermediate its ends for receiving a metal conduit in snap-in relation. The metal conduit is formed as a continuous line and functions as a part of an electric circuit. Plastic support hangers have corresponding laterally opening recesses for the pipe and conduit. The support hangers are used as needed between the drop hangers to maintain the pipe in non-sagging relation relative to the conduit or to support a shocker wire. The pipe carries spaced animal operated drinker valves, which may be mounted in drinker cups. The conduit recesses of the hangers allow relative longitudinal movement of the conduit to accommodate different rates of thermal expansion of the conduit and pipe. A shocker wire is supported by the hangers above and parallel with the conduit form branches of an electrical circuit. Birds seeking to roost on the wire will complete the circuit to produce a gentle shock. This device does not disclose providing protection for the shocker wire electricity supply couplings.

U.S. Pat. No. 5,097,797 issued to Van Zee, et al., on Mar. 24, 1992, entitled Poultry feeder is for a poultry feeder releasably attachable to a feed conveyor and adjustable to feed poultry on either an ad libitum basis or a restricted feed basis. A segmented cage is mounted on an upright barrel member that is releasably attached to the feed conveyor. Feed from the conveyor passes through the barrel member to a feed pan suspended beneath the barrel member by the segmented case. In the restricted feeding mode, the barrel member can store feed for release into the feed pan as feed is consumed by the poultry. In the overfill or ad libitum mode, a control member directs feed outside of the barrel member into the feed pan to more completely fill the pan for improved access to young poultry. Again, this device does not disclose providing protection for the shocker wire electricity supply couplings.

U.S. Pat. No. 5,178,079 issued to Hostetler, on Jan. 12, 1993, entitled Extruded pipe watering system is for a poultry watering system is provided having a support conduit integrally formed within a flange extending from and integrally formed with a fluid conduit. That flange further includes a snap-fit connection to a hanger bracket which also mounts a two wire anti-roosting device. The fluid conduit also includes saddle flanges retained via snap-fit which shield the saddles and associated drinker devices from run off. When so retained, the saddles penetrate the fluid conduit and permit fluid flow to the drinker devices. The fluid conduit, its flanges and the support conduit can be extruded as a unitary element from PVC plastic materials while other materials can be employed for the saddle and drinker devices to minimize costs without loss of system effectiveness in performance. This device connects shocker wires to electrical supply wires conventionally with no disclosure of protection at the coupling.

U.S. Pat. No. 4,884,528 issued to Steudler, Jr., on Dec. 5, 1989, entitled Water pipe bracket and clip for poultry, small animals and the like watering system is for a height-adjustable watering system which includes a watering pipe connected to a source of water and carrying a plurality of drinkers, brackets for suspending the water pipe, each bracket having a pair of arms for clampingly embracing the water pipe, and a clip secured by tongues and grooves to the arms to prevent the water pipe from inadvertently or accidentally being removed from the clamping arms. This device does not disclose providing protection for the shocker wire electricity supply couplings.

U.S. Pat. No. 5,097,798 issued to Little, on Mar. 24, 1992, entitled Fowl watering system is for a poultry watering apparatus comprising a water pipe and a thin anti-roost member extending upwardly from the pipe. In one form of the invention, the pipe and the member are formed integrally, and a coupling is attached to the member for suspending the pipe. In another form of the invention one or more pipe hangers are provided, each comprising a clamp having opposing members which form an opening therebetween for a pipe and an upwardly extending anti-roost member connected to the upper side of the clamp. A coupling is provided comprising a clamp and an anti-roost member both of substantially identical shape as the pipe hangers but also being slightly larger and enveloping the pipe hangers in order to support them. This device does not use a shocker wire but rather a physical impediment to bird roosting on the water supply lines.

Also, commercially available equipment and components may be relevant, including commercial feeders, waterers, pvc lines and couplings or the like. Such equipment may be used in implementing an exemplary embodiment in accordance with the present invention.

None of these references, either singly or in combination, disclose or suggest the present invention.

While it is evident from past installations of feeder and water supply lines in poultry houses hat shock wires for protecting these lines from birds are known. It is desirable to have a shroud for protecting the electric couplings for powering the shock wires in a poultry house to address the perceived shortcomings of the known art.

SUMMARY OF THE INVENTION

The present invention addresses the perceived needs in the known art discussed above. In this regard, the present invention substantially fulfills this need. The new shroud of the present invention provide a protective housing that may be advantageously employed with conventional feed and water supply lines and their associated shock wires.

In one exemplary embodiment in accordance with the present invention an improved protective shroud is provided that protects electrical couplings from being pecked by birds.

In another exemplary embodiment in accordance with the present invention, an improved protective shroud that uses a small pvc housing is provided.

It is an object of the present invention to provide an improved protective shroud that is easily installed on existing conventional feed and water lines.

It is another object of the present invention to provide a safety shroud to prevent undesirable animal injury.

Another object is to provide a shroud that may be easily used with and adapted to existing poultry houses.

These and other objects and advantages of the present invention, along with features of novelty appurtenant thereto, will appear or become apparent by reviewing the following detailed description of the invention in conjunction with the appended drawings.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

The present invention addresses the perceived needs in the known art discussed above. In this regard, the present invention substantially fulfills this need.

Figure 1:
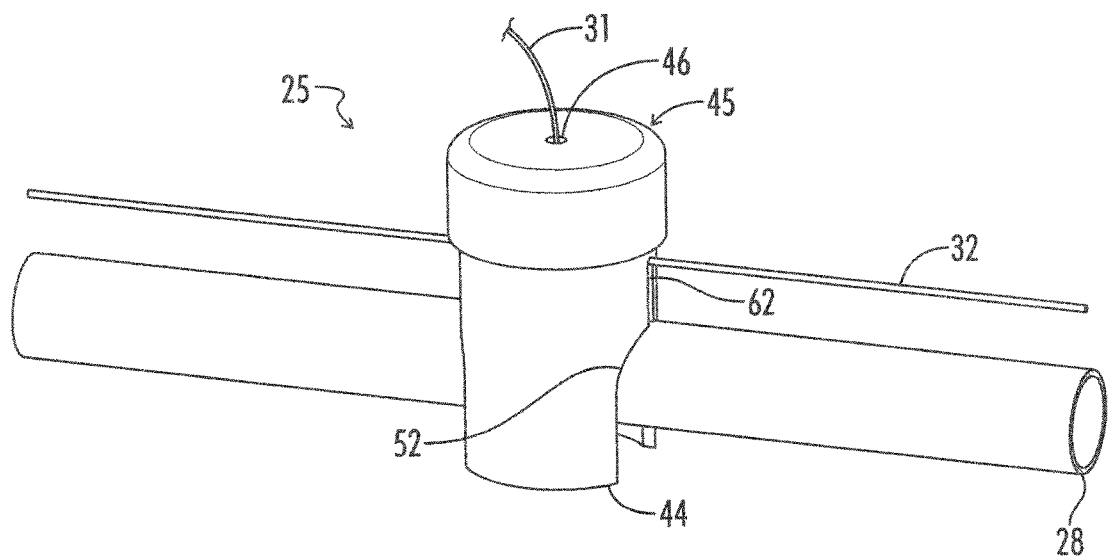
FIG. 1 is an environmental view showing one exemplary embodiment of the protective shroud for shock wire coupling adjacent to the coupling in accordance with the present invention.
Figure 2:
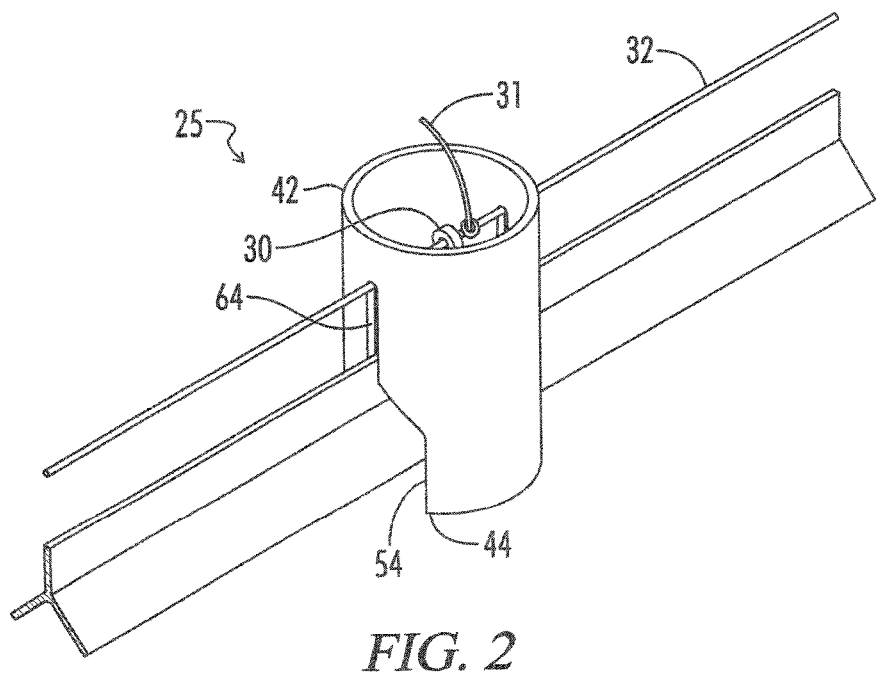
FIG. 2 is another environmental view taken from the back and with the top removed thereof.
Figure 3:
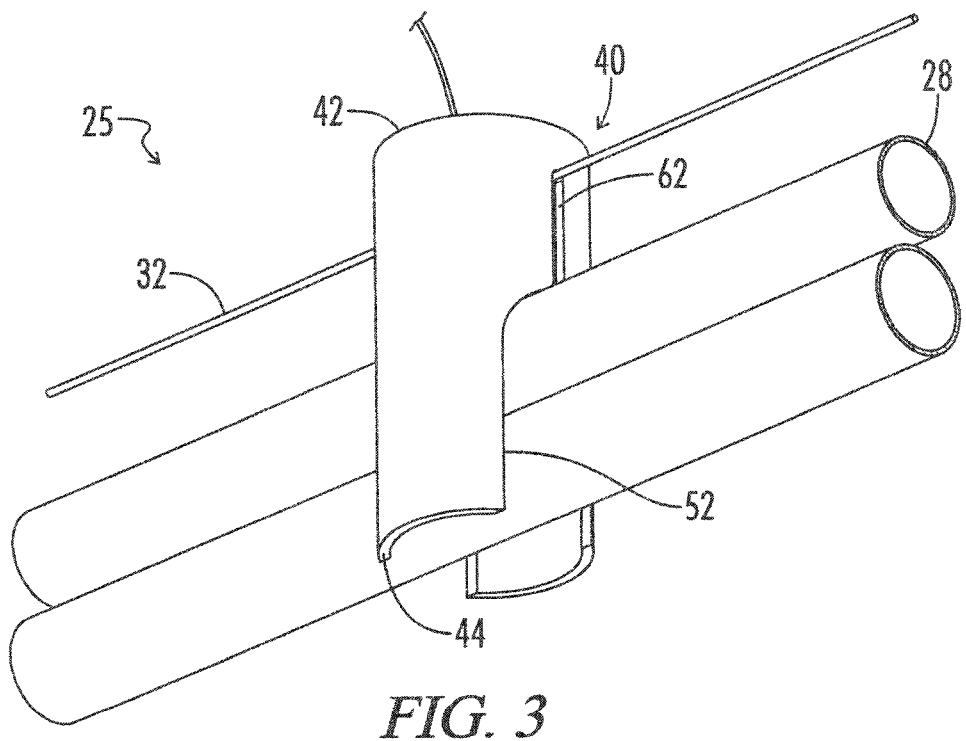
FIG. 3 is an environmental view taken from the bottom front thereof.
Figure 4:
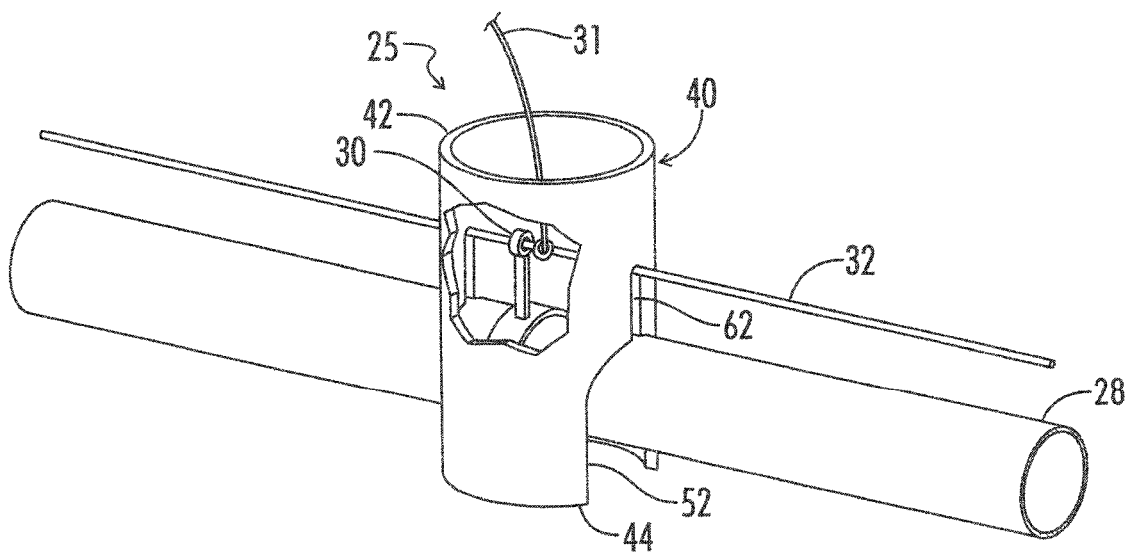
FIG. 4 is a perspective view similar to FIG. 1 but with portions omitted or shown in section for clarity
Figure 5:
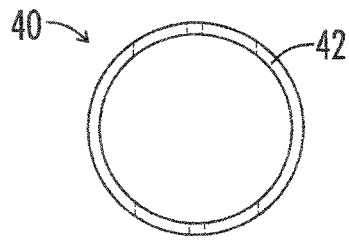
FIG. 5 is a top plan view photograph thereof.
Figure 6:
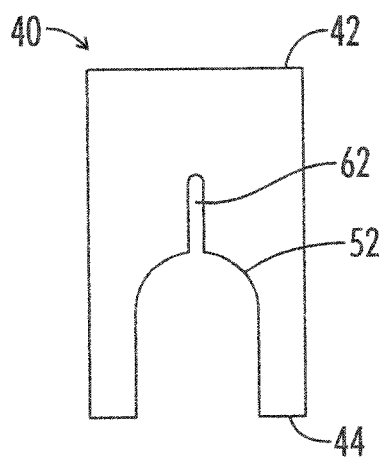
FIG. 6 is a side elevational view with the opposite side being a mirror image thereof.
Figure 7:
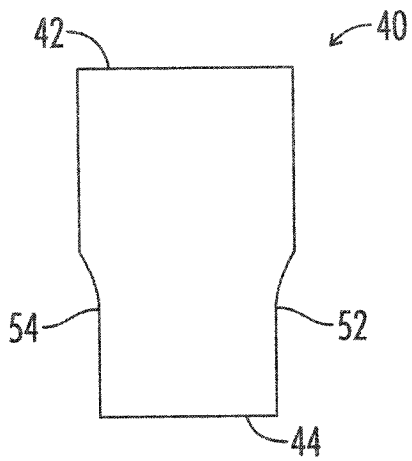
FIG. 7 is another side elevational thereof.
Figure 8:
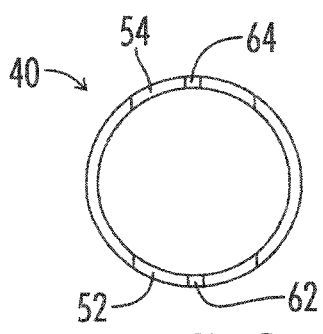
FIG. 8 is a bottom plan view thereof.
Figure 9:
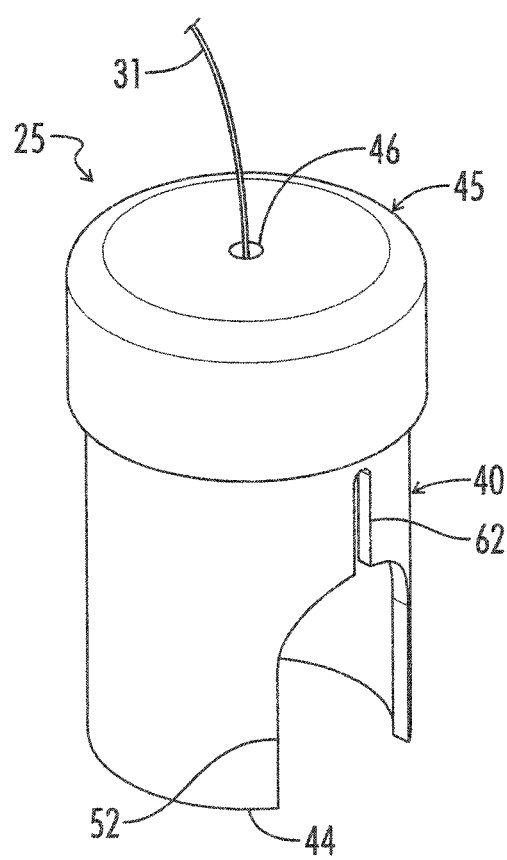
FIG. 9 is a side perspective view taken thereof with the optional cap.
Figure 10:
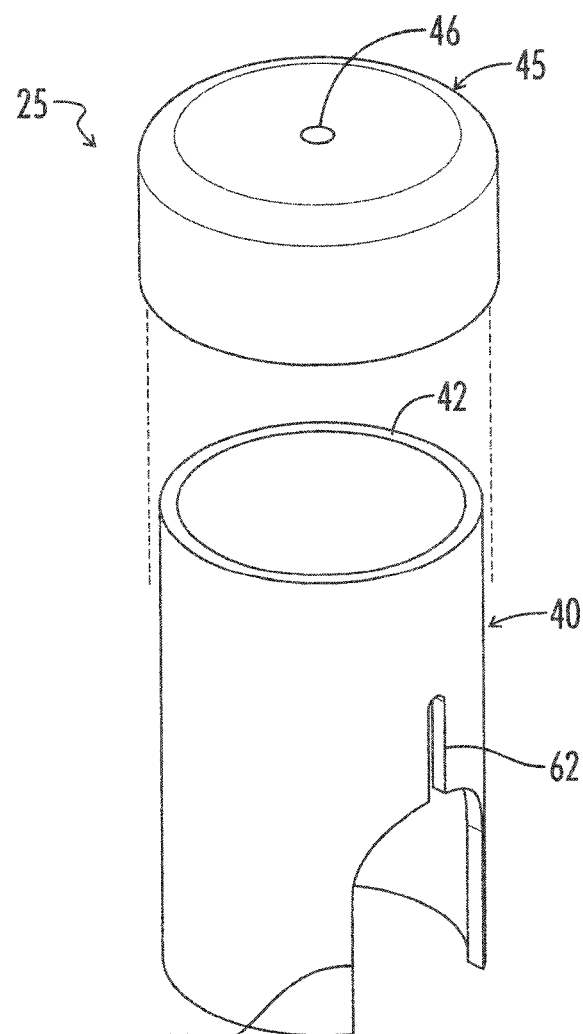
FIG. 10 is a side perspective view thereof with the optional cap exploded therefrom; and, FIG. 11 is an environmental view showing one exemplary embodiment of the protective shroud for shock wire coupling adjacent to the coupling in accordance with the present invention.
Figure 11:
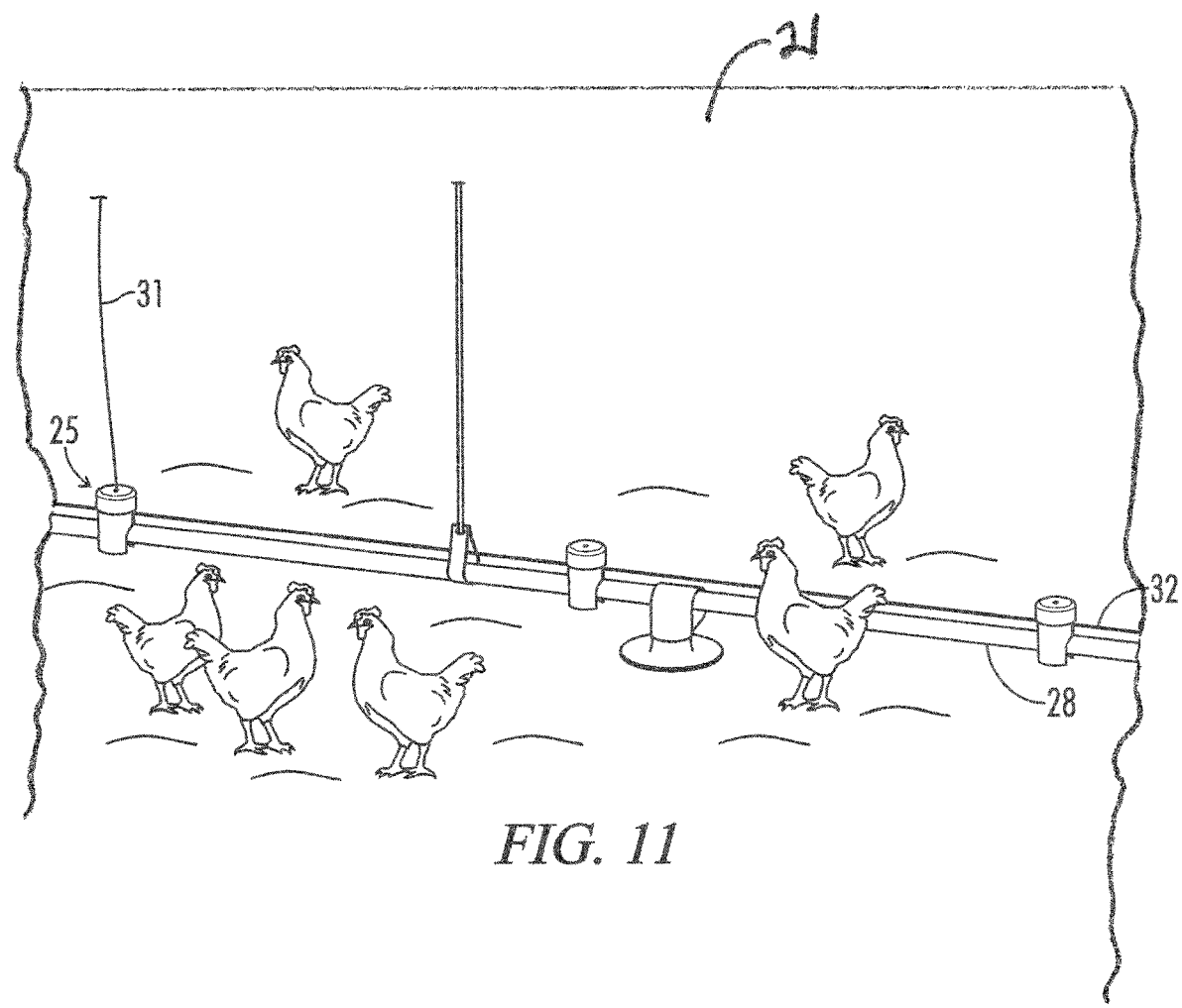

The invention includes a protective shroud for electric coupling that is generally indicated by reference numeral 25 in FIGS. 1-11. The shroud 25 is deployed in a poultry house on a feed supply line 28 (it could also be installed similarly on a water supply line or a support brace for either as well). The shroud 25 covers and substantially prevents access to the electric coupling 30 that provides electricity to a conventional shock wire 32. FIG. 11 shows an exemplary embodiment where the shroud 25 is installed with a shock line in a poultry house 21.

The conventional feed supply line 28 is approximately two inches in diameter. The shroud (or guard) 25 needs to be wide enough to fit over the feed supply line or approximately at least 2.85 inches in width. A four inch diameter pvc section of pipe was found to be sufficient to fit over the supply line 28 to provide a wide enough base to accommodate the supply line for the guard 25. Generally, the water supply lines are smaller in diameter so a smaller two inch diameter pvc section of pipe was suitable to form the guard 25 when place over water supply line 28.

Guard 25 may be advantageously cut from an approximately six inch long section of standard or conventional pvc piping of either or two or four inch diameter to fit either the water or feed supply line. The guard 25 thus has an elongate cylindrical shape that forms a hollow housing 40.

Guard housing 40 is open at both ends 42, 44. End 42 is simply a round open end. End 44 has arcuate cut-outs 52, 54 on opposing housing sides to facilitate the seating of the Guard 25 on the supply line 28. The cut-outs 52, 54 are in the shape of an arch with a base of approximately 2.85 inches in width at end 42 and extending toward end 44 approximately 2.25 inches to a radiussed peak (to match the outer diameter of the supply line).

Centered on each cut-out 52, 54 at the peak is an elongated slot 62, 64 for the shock wire to pass through the housing 40. Each slot 62, 64 is approximately 0.25 inches in width and 1.25 inches in length (but could be larger as necessary to accommodate shock wires of larger diameter).

An optional cap 45 may be placed over end 42 if desirable. The cap 45 is a conventional pvc cap of the appropriate diameter hat has a hole 46 in it to permit the installation of the electrical supply line 31 for the coupling 30.

In use, the shroud 25 is installed over the coupling 30 and seated on the supply line 28. The shroud 25 does not have to be permanently affixed to the line 28 and gravity and the friction provided by the shock line 32 is sufficient to retain the shroud 25 in place. Usually the housing 40 is of sufficient depth and narrow enough to prevent animals from inserting their heads into the housing to reach the protected coupling 30. But if animals with smaller heads are present, the optional cap 45 is employed to prevent access to coupling 30.

Usually, each supply line has a single coupling to protect at an end of the line and so a single guard 25 is all that is necessary to protect the coupling 30. Usually a house has several supply lines and each line requires a guard 25 at each of its couplings 30 (e.g. a conventional house may require 20 or 30 or more guards for all of the couplings).

In describing a preferred embodiment of the invention illustrated in the drawings, specific terminology has been used for the sake of clarity. However, the invention is not intended to be limited to the specific terms selected, and it is to be understood that each specific term includes all technical equivalents which operate in a similar manner to accomplish a similar purpose.

What is claimed is:

1. A protective shroud for an indoor electrical coupling for a shock wire supported on a water or supply line, the shroud comprising:
    a hollow, elongated, cylindrical housing with spaced apart ends having a flat opening at a first end and with at least two arcuate cutouts at the opposite end;
    an elongated slot in each of the cutouts, each slot extending from the cutout toward the flat opening; and,
    wherein the housing is adapted to gravitationally sit on the supply line around the electrical coupling and against the shock wire to thereby protect the coupling.

2. The protective shroud as recited in claim 1 wherein the cutouts are defined on opposite housing sides.

3. The protective shroud as recited in claim 2 further comprising a cap adapted to fit over the open housing end.

* * * * *